US011830311B1

(12) United States Patent
Bancroft

(10) Patent No.: US 11,830,311 B1
(45) Date of Patent: Nov. 28, 2023

(54) AUTOMATED PIZZA KITCHEN

(71) Applicant: Frederic Speed Bancroft, Baton Rouge, LA (US)

(72) Inventor: Frederic Speed Bancroft, Baton Rouge, LA (US)

(73) Assignee: Bancroft Automated Restaurant Systems, Inc., Baton Rouge, LA (US)

( * ) Notice: Subject to any disclaimer, the term of this patent is extended or adjusted under 35 U.S.C. 154(b) by 10 days.

(21) Appl. No.: 17/336,205

(22) Filed: Jun. 1, 2021

Related U.S. Application Data

(63) Continuation-in-part of application No. 15/947,776, filed on May 7, 2018, now abandoned, and a continuation-in-part of application No. 15/965,331, filed on Apr. 27, 2018, now abandoned.

(51) Int. Cl.
*G07F 17/00* (2006.01)
*G07F 11/58* (2006.01)
*G07F 9/02* (2006.01)
*G07F 9/10* (2006.01)
*G06F 16/9535* (2019.01)

(52) U.S. Cl.
CPC .......... *G07F 17/0078* (2013.01); *G07F 9/026* (2013.01); *G07F 9/105* (2013.01); *G07F 11/58* (2013.01)

(58) Field of Classification Search
CPC ...... G07F 17/0078; G07F 9/026; G07F 9/105; G07F 11/58
USPC .......................................................... 99/325
See application file for complete search history.

(56) References Cited

U.S. PATENT DOCUMENTS

| | | | | |
|---|---|---|---|---|
| 5,188,020 A | * | 2/1993 | Buchnag | G07F 17/0078 99/484 |
| 5,251,426 A | * | 10/1993 | Heisler | B65B 7/2807 53/287 |
| 9,953,193 B2 | * | 4/2018 | Butler | G06K 17/0022 |
| 10,617,321 B2 | * | 4/2020 | Slater | G06F 16/9535 |
| 2012/0185086 A1 | * | 7/2012 | Khatchadourian | G07F 11/70 99/345 |

* cited by examiner

*Primary Examiner* — Garcia Ade

(57) ABSTRACT

An automated pizza kitchen capable of storing dozens of pre-topped, par-baked pizzas, each held in a pizza box bottom in a humidity-controlled refrigerator, selecting a pizza out of the refrigerator, cooking the pizza, securing a pizza box lid to the pizza box bottom, and storing the pizza in a warmer, capable of holding and heating dozens of cooked pizzas.

13 Claims, 23 Drawing Sheets

1105, 1106

AUTOMATED PIZZA KITCHEN

REFERENCE TO RELATED APPLICATION

The present application is a continuation-in-part of U.S. patent application Ser. No. 15/965,331 filed Apr. 27, 2018 and U.S. patent application Ser. No. 15/947,776 filed May 7, 2018, and also claims priority to U.S. provisional application No. 41/465,559 filed Dec. 22, 2020, the disclosures of which are hereby incorporated by reference herein.

FIELD OF THE INVENTION

The present application relates to a food preparation system, specifically an automated pizza kitchen capable of automatically preparing pizzas.

BACKGROUND OF THE INVENTION

The instant automated pizza kitchen invention, in one embodiment, is capable of storing dozens of pre-topped, par-baked pizzas, each held in a pizza box bottom in a humidity-controlled refrigerator. Either due to an order placed by a customer (directly at the automated pizza kitchen or remotely using, for example, a cell phone application) or at a pre-determined time, the automated system selects a pizza out of the refrigerator, passes it through an oven to finish cooking the pizza and secures a pizza box lid to the pizza box bottom. Thereafter, the pizza is stored in a warmer, capable of holding and heating dozens of cooked pizzas, on a pre-selected shelf. When the customer arrives at the automated pizza kitchen, the pizza is selected from the correct shelf and dispensed to the customer.

The automated pizza kitchen may be located within a pre-existing business, building, restaurant or convenience store, or alternatively it may be located in an outdoor open area such as a parking lot, amusement park or sporting event arena.

Prior to the instant invention, pizzas were generally prepared one at a time using a conventional pizza oven and delivered to the customer directly upon completion of the cooking process. However, this method of preparing and delivering pizzas is time consuming and labor intensive and, therefore, relatively expensive. Moreover, this one at a time method of preparing pizzas made it difficult for the preparer to handle both in-person and remote orders made at the same time and made it difficult to timely serve both types of orders. With the increasing popularity of remote ordering using, for example, cell phone applications, a way of preparing pizzas that can efficiently and cost-effectively handle these logistical challenges is needed.

One important and advantageous feature of the instant invention is its ability to heat and hold dozens of pizzas at one time without compromising pizza quality. This provides the ability to serve various types of customers at the same time. For example, the automated pizza kitchen is capable of producing and timely providing pizzas to walk-up customers ordering directly from the automated pizza kitchen and also capable of providing pizzas to customers who previously ordered using a cell phone application. Moreover, the ability to heat and hold dozens of pizzas permits the system to make pizzas in advance and at times that have been previously determined to be popular pizza ordering hours.

Others have attempted to produce pizzas using pizza vending machines, however, those machines have no heat and hold capacity. Thus, in order for a customer to obtain a pizza, they are required to input their order at the machine and then wait at the machine until the pizza cooking is complete and dispensed to the customer. This type of machine results in long lines forming to use the machine and is incapable of serving large numbers of people such as those found at amusement parks and sporting arenas.

SUMMARY OF THE INVENTION

In one aspect, the instant automated pizza kitchen invention comprises a refrigerator comprising refrigerator shelves, a refrigerated pizza selection device comprising a lifting platform and actuator; and a refrigerator exit door. The invention may also include an oven comprising an oven conveyor and wherein said oven is connected to said refrigerator by a refrigerator-to-oven conveyor. The invention may further comprise a lid placer with a lid placer conveyor wherein said lid placer conveyor connects said lid placer to said oven conveyor and wherein said lid placer further comprises: a lid cage surrounding a stack of pizza box lids; dispensing rods for dispensing individual pizza box lids; and a lid securer. The invention may also include a warmer connected to said lid placer conveyor by a lid placer-to-warmer conveyor and further comprising warmer shelves; a cooked pizza selection device; and a pizza dispenser.

Another aspect of the invention is the use of the automated pizza kitchen wherein a customer enters an order into a customer interface, the customer interface communicates with a system processor; and the system processor directs the automated pizza kitchen to prepare said order.

BRIEF DESCRIPTION OF THE DRAWINGS

FIG. 15 is an interior view of the warmer of an embodiment of the automated pizza kitchen invention.

DETAILED DESCRIPTION

Figure 1:
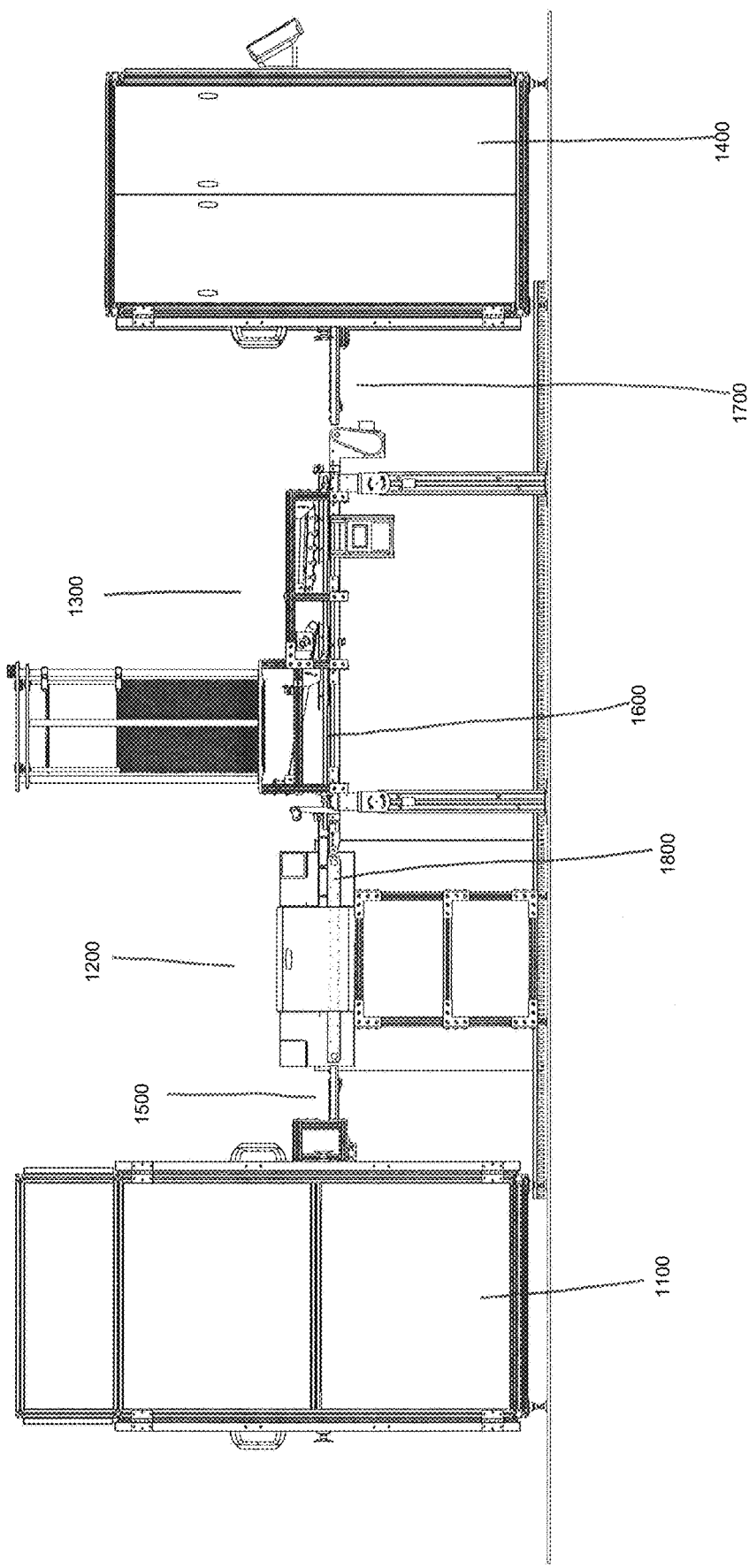
FIG. 1 is a side view of an embodiment of the automated pizza kitchen invention.

One or more different inventions may be described in the present application. Further, for one or more of the inventions described herein, numerous alternative embodiments may be described; it should be appreciated that these are presented for illustrative purposes only and are not limiting of the inventions contained herein or the claims presented herein in any way. One or more of the inventions may be widely applicable to numerous embodiments, as may be readily apparent from the disclosure. In general, embodiments are described in sufficient detail to enable those skilled in the art to practice one or more of the inventions, and it should be appreciated that other embodiments may be utilized and that structural, logical, software, electrical and other changes may be made without departing from the scope of the particular inventions. Accordingly, one skilled in the art will recognize that one or more of the inventions may be practiced with various modifications and alterations. Particular features of one or more of the inventions described herein may be described with reference to one or more particular embodiments or figures that form a part of the present disclosure, and in which are shown, by way of illustration, specific embodiments of one or more of the inventions. It should be appreciated, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Pizza Kitchen & Components

FIGS. 1, 3, 5 and 6 depict an embodiment of the automated pizza kitchen 1000. The automated pizza kitchen 1000 comprises a refrigerator 1100, a refrigerator-to-oven conveyor 1500, an oven 1200, a lid placer 1300, a lid placer-to-warmer conveyor 1700 and a warmer 1400.

The refrigerator 1100, shown in detail in FIGS. 4, 7, 8 and 9, is capable of storing dozens of pre-made and par-baked pizzas 2000 at 34 degrees Fahrenheit and comprises a refrigerator housing 1101 with front refrigerator doors 1102 and rear refrigerator doors 1104 used to access the interior of the refrigerator 1100.

The pizzas 2000 stored in the refrigerator 1100 may be par baked crusts without any toppings or may be pre-made par baked pizzas 2000 previously topped in a separate food service area, commissary, convenience store, restaurant or grocery store. The pizzas 2000 may also be pre-browned on the bottoms to result in a top quality pizza. The pizzas 2000 may be delivered to the automated pizza kitchen 1000 via an insulated truck or mobile, wheeled cabinet. After the pizzas 2000 are delivered to the automated pizza kitchen 1000, the pizzas 2000 are loaded into the refrigerator shelves 1106 of the refrigerator 1100.

Located at or near the top of the refrigerator 1100 is the condensing unit and a humidity and temperature control system housing 1103. As the automated pizza kitchen 1000 may be located in an open-air location like an amusement park or outdoor sports arena, it is advantageous that it comprises a humidity control system (not pictured). The humidity and temperature control system comprises a humidity sensor located in the interior of the refrigerator 1100 that measures the humidity of the interior of the refrigerator and is capable of adjusting the humidity if it rises above or drops below the desired humidity level. In one embodiment, a temperature and humidity control system may comprise the Therma wireless humidity and temperature sensor manufactured by Therma.

Moreover, the condensing unit (not pictured) may be alternatively configured so that instead of maintaining the pizzas at 34 degrees Fahrenheit (wherein pizzas held at this temperature should generally only be held for at most 72 hours for food safety reasons), the refrigerator may hold the pizzas below 32 degrees Fahrenheit, thus freezing the pizzas, and permitting the pizzas to be held for longer than 72 hours. This ability to freeze the pizzas is advantageous if the automated pizza kitchen 1000 is located in a rural or low-traffic area.

Figure 9:
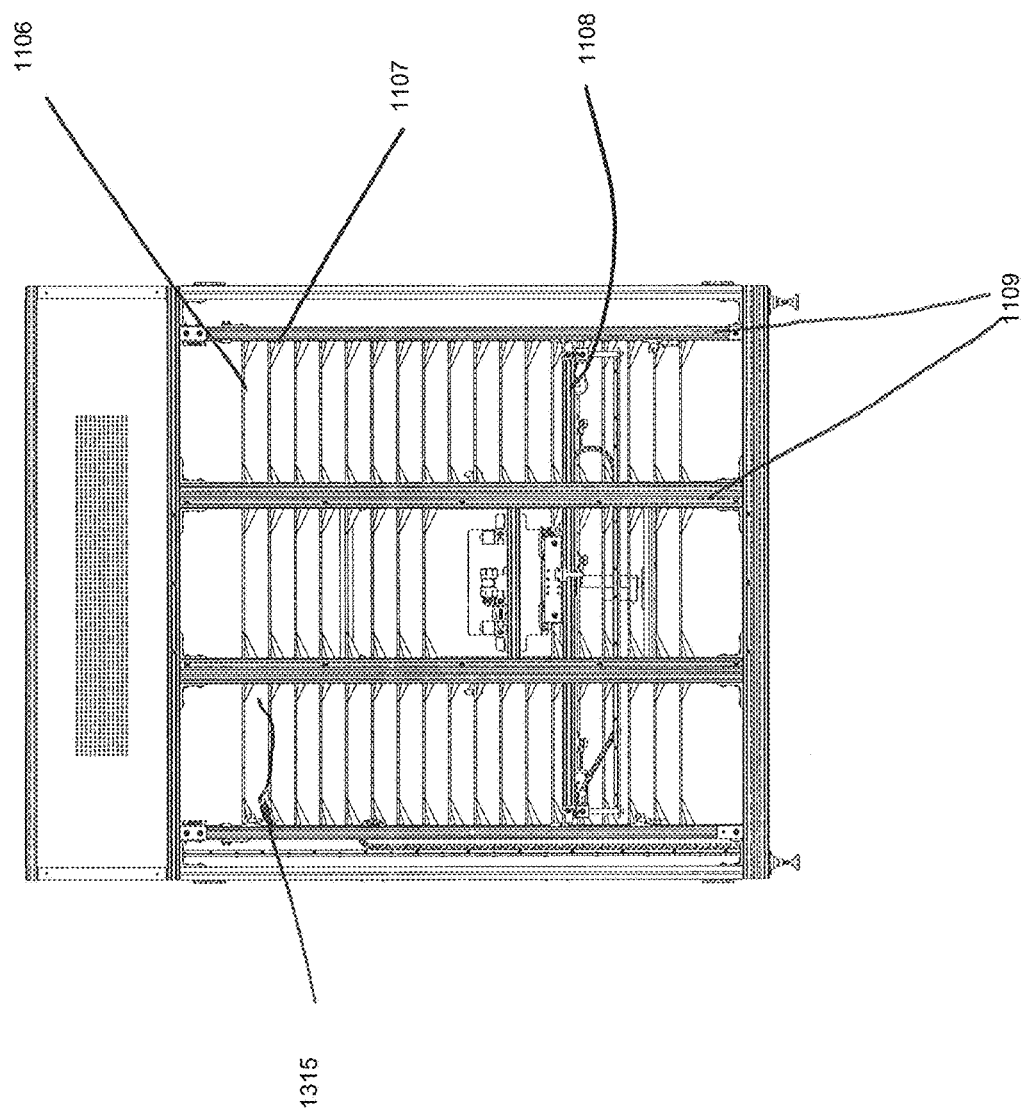
FIG. 9 is an interior view of the refrigerator viewed through the rear doors of an embodiment of the automated pizza kitchen.
Figure 19:
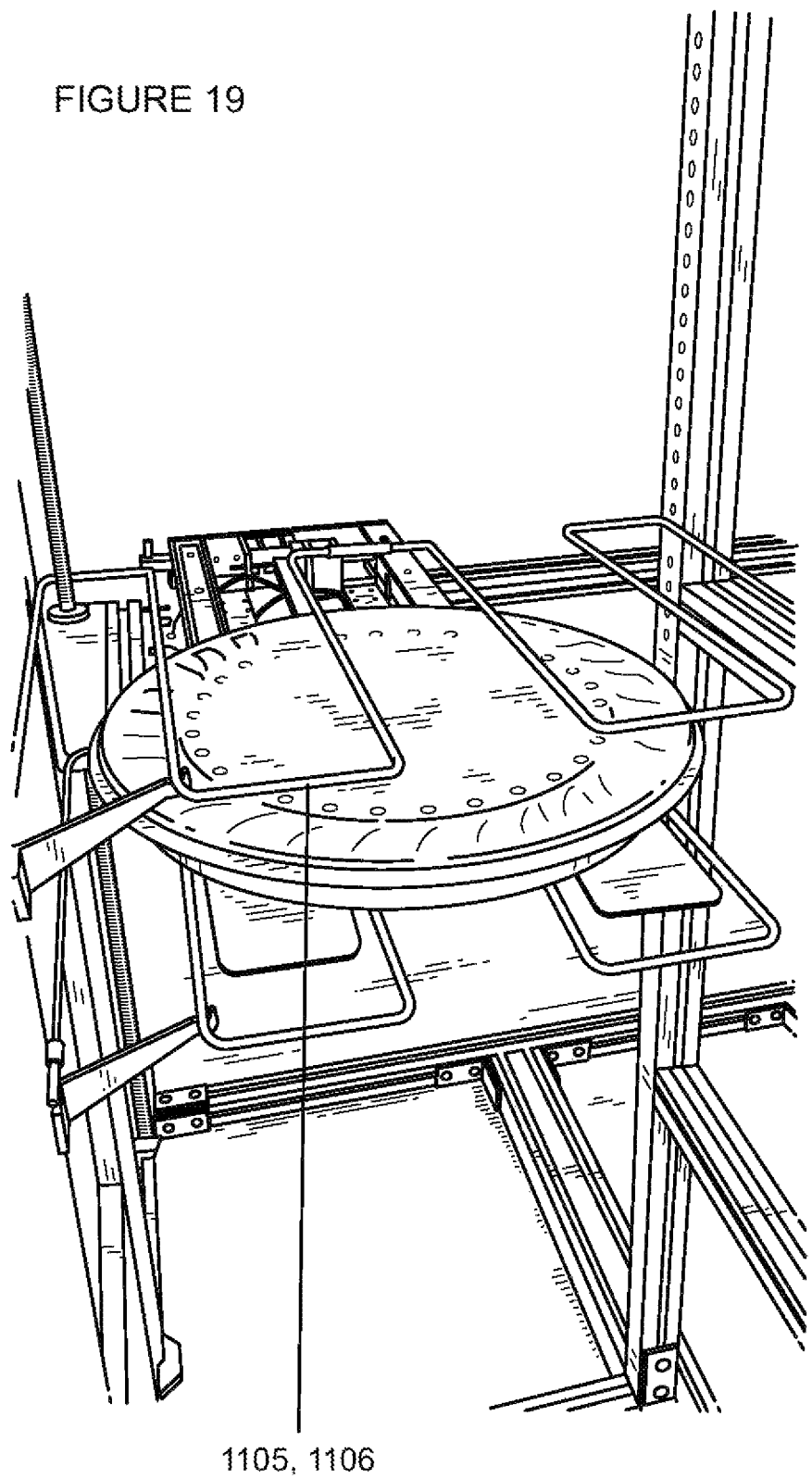
FIG. 19 is an embodiment of a refrigerator shelf or a warmer shelf wherein the shelf is w-shaped.

FIG. 9 depicts the interior of the refrigerator 1100. The interior of the refrigerator 1100 comprises multiple refrigerator vertical beams 1109 to which a multitude of refrigerator shelves 1106 are attached. In the embodiment shown in FIG. 9, the refrigerator 1100 comprises three columns of refrigerator shelves 1106 with each column comprising approximately 18 refrigerator shelves 1106 arranged in parallel. The refrigerator shelves 1106 are further secured to the refrigerator vertical beams 1109 using refrigerator shelf supports 1107. In alternate embodiment, the refrigerator shelves 1106 may be different shaped. For example, the refrigerator shelves 1106 may be wire shelves rather than solid shelves. Also, the refrigerator shelves 1106 may also be w-shaped, as shown in FIG. 19, to better assist the refrigerated pizza selection device 1108 (discussed below) in selecting pizzas 2000 from the refrigerator shelves 1106.

Figure 7:
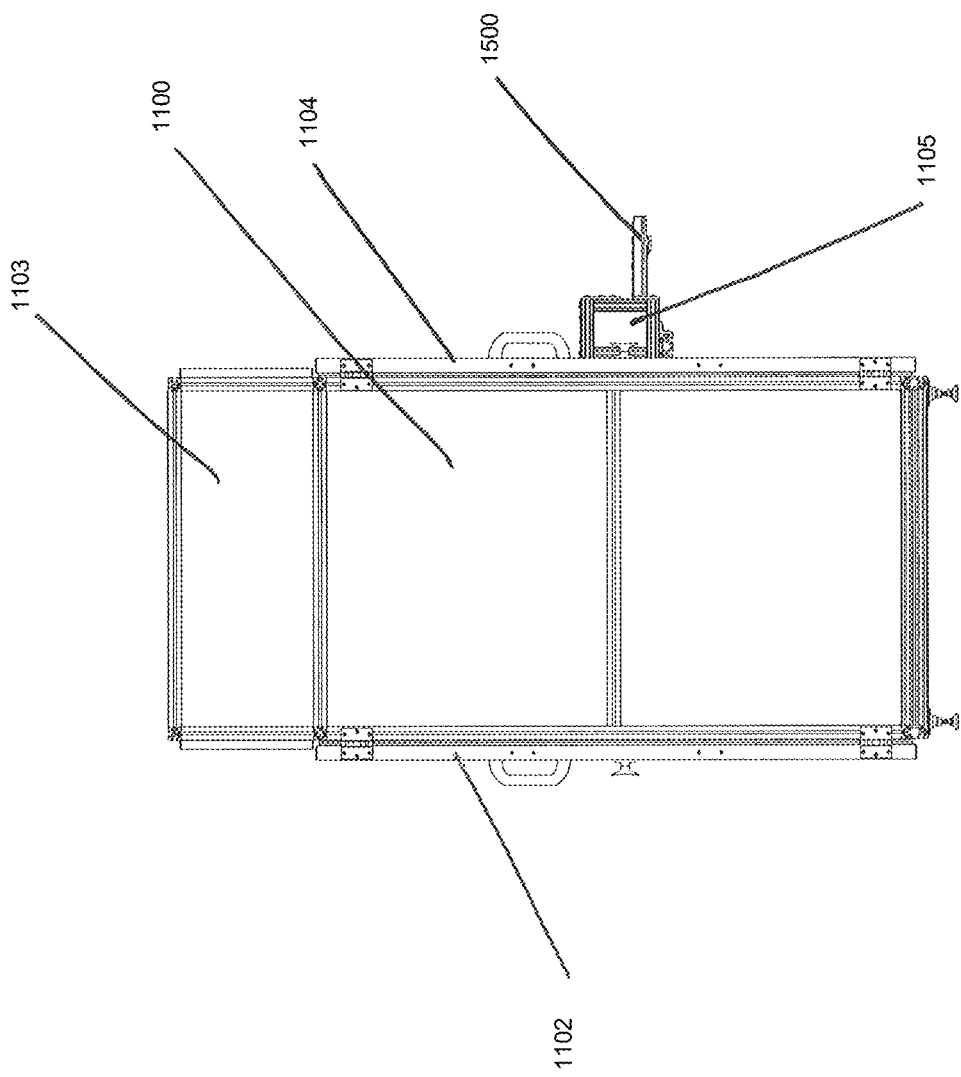
FIG. 7 is a side view of the refrigerator of an embodiment of the automated pizza kitchen invention.
Figure 8:
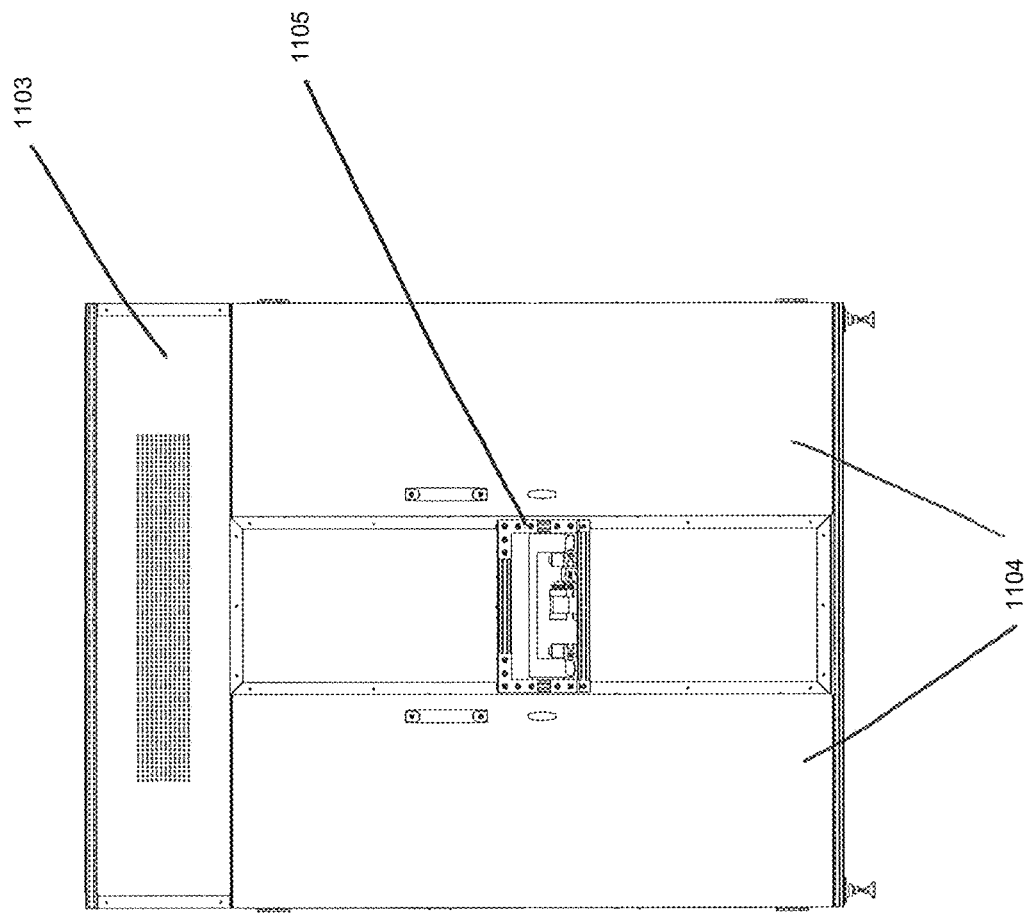
FIG. 8 is a rear view of the refrigerator of an embodiment of the automated pizza kitchen invention.
Figure 9A:
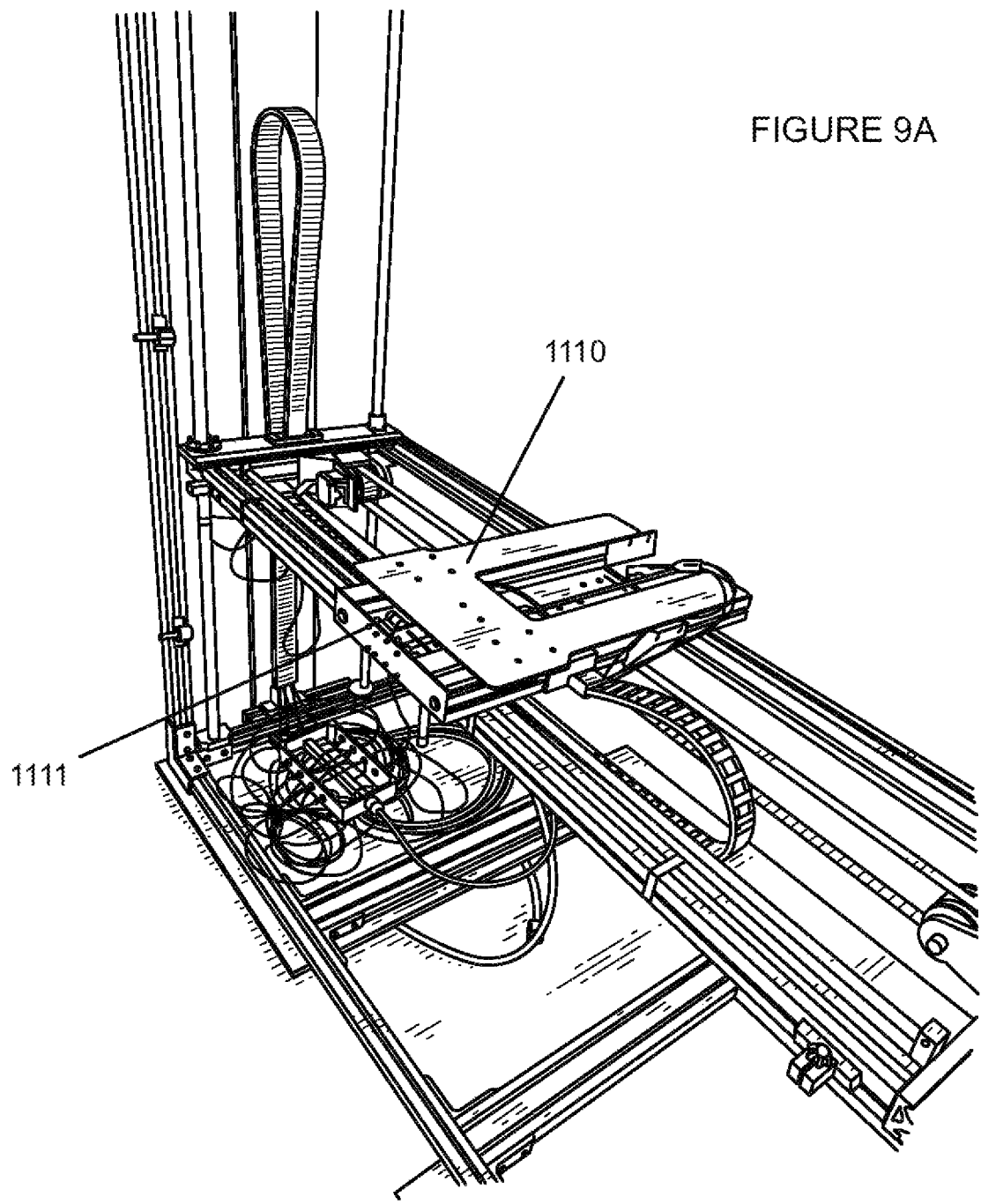
FIG. 9A is a close-up view of the refrigerated pizza selection device.

FIGS. 9 and 9A also depict the refrigerated pizza selection device 1108 that is used to move a pizza 2000 contained in a pizza box bottom 1315 from a refrigerator shelf 1106, out of the refrigerator 1100 and onto to the refrigerator-to-oven conveyor 1500 (shown in FIG. 7). The refrigerated pizza selection device 1108 may comprise a lifting platform 1110 controlled by a linear actuator 1111 capable of moving the lifting platform along an xy or xyz axis. In one embodiment, the refrigerated pizza selection device 1108 may be an XYZ Gantry manufactured by Igus. The lifting platform 1110 may be pushed under the pizza box bottom 1315 sitting on a refrigerator shelf 1106 to lift the pizza box bottom 1315 off the refrigerator shelf 1106 (and when the refrigerator shelf 1106 is w-shaped the reduced points of contact between the pizza box bottom 1315 and the refrigerator shelf 1106 results in the lifting platform 1110 being able to more easily lift the pizza box bottom 1315) and may then move the pizza 2000 to the refrigerator exit 1105 and push the pizza 2000 out of the refrigerator 1100.

In one embodiment the refrigerated pizza selection device 1108 further comprises a marking device that is capable of placing a QR code or other identifying code on the pizza box bottom 1315. This code may then be tracked as the pizza box bottom 1315 travels through the automated pizza kitchen 1000 and used to maintain an inventory of the automated pizza kitchen 1000. The code may also be used to provide instructions to the automated pizza kitchen 1000, by, for example, indicating the cook time and temperature for cooking the contents of the pizza box bottom 1315 (when, for example, bread sticks or pastries contained in pizza box bottom 1315 may require a different cooking time and temperature than standard pizzas 2000). In one embodiment, the marking device is a marking system manufactured by Rea Jet.

Figure 3:
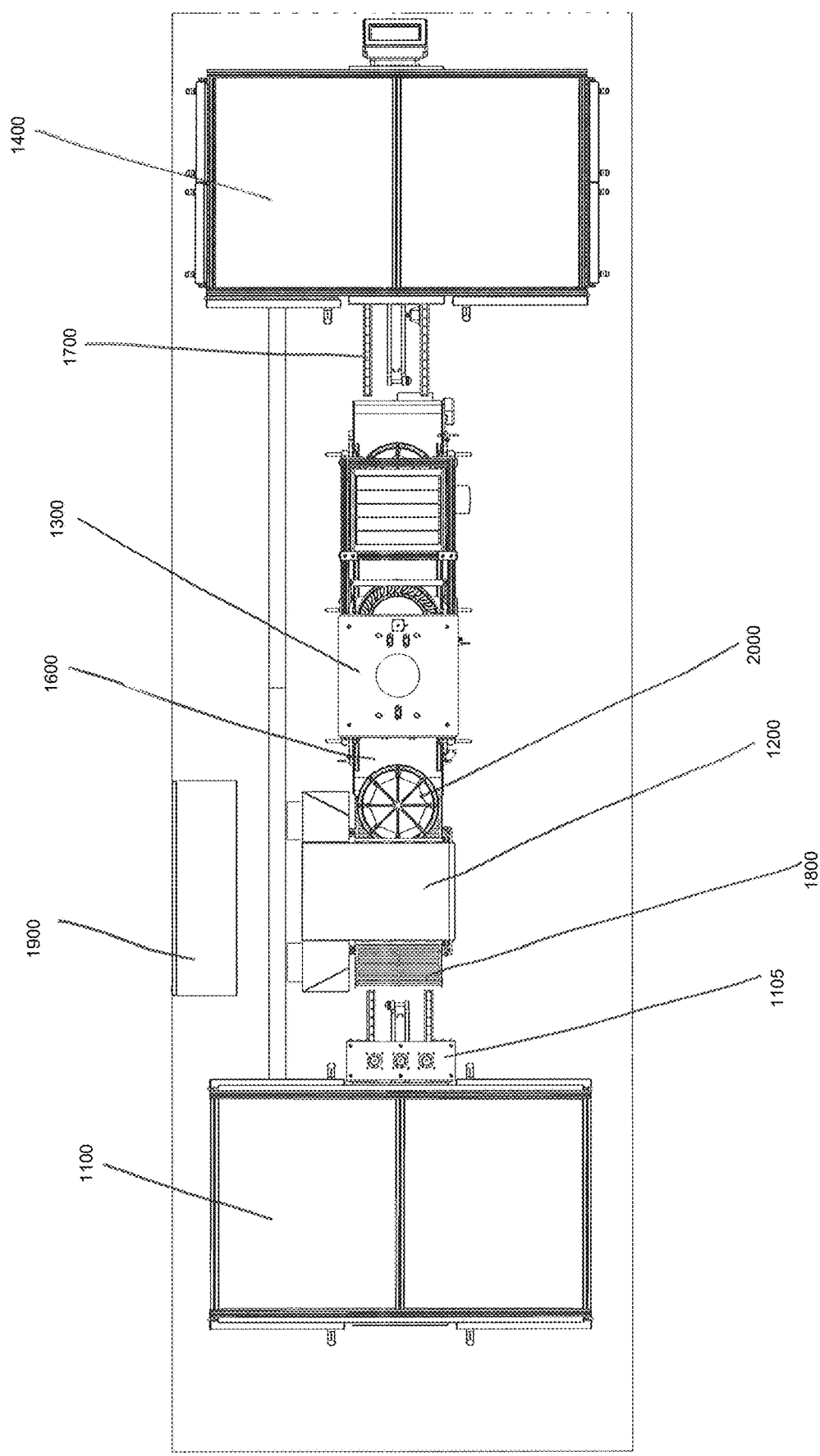
FIG. 3 is an overhead view of an embodiment of the automated pizza kitchen invention.

As can be seen in FIG. 3, after the pizza 2000 contained in the pizza box bottom 1315 leaves the refrigerator 1100 via the refrigerator exit 1105 and the refrigerator-to-oven conveyor 1500 moves it to the oven conveyor 1800 and into the oven 1200. The refrigerator exit 1105 comprises a door that opens to permit the pizza 2000 to exit but otherwise stays closed to maintain the desired temperature and humidity of the refrigerator 1100. The refrigerator exit 1105 further may comprise exhaust fans to direct hot air escaping from the oven 1200 away from the refrigerator exit 1105 to further aid in maintaining the temperature and humidity of the refrigerator 1100.

In an alternate embodiment, pizzas 2000 that are not previously topped are directed to an automated pizza topping system (not pictured) prior to being transported to the oven 1200. One example of such an automated pizza topping system is the Picnic Pizza System manufactured by Picnic.

Figure 3A:
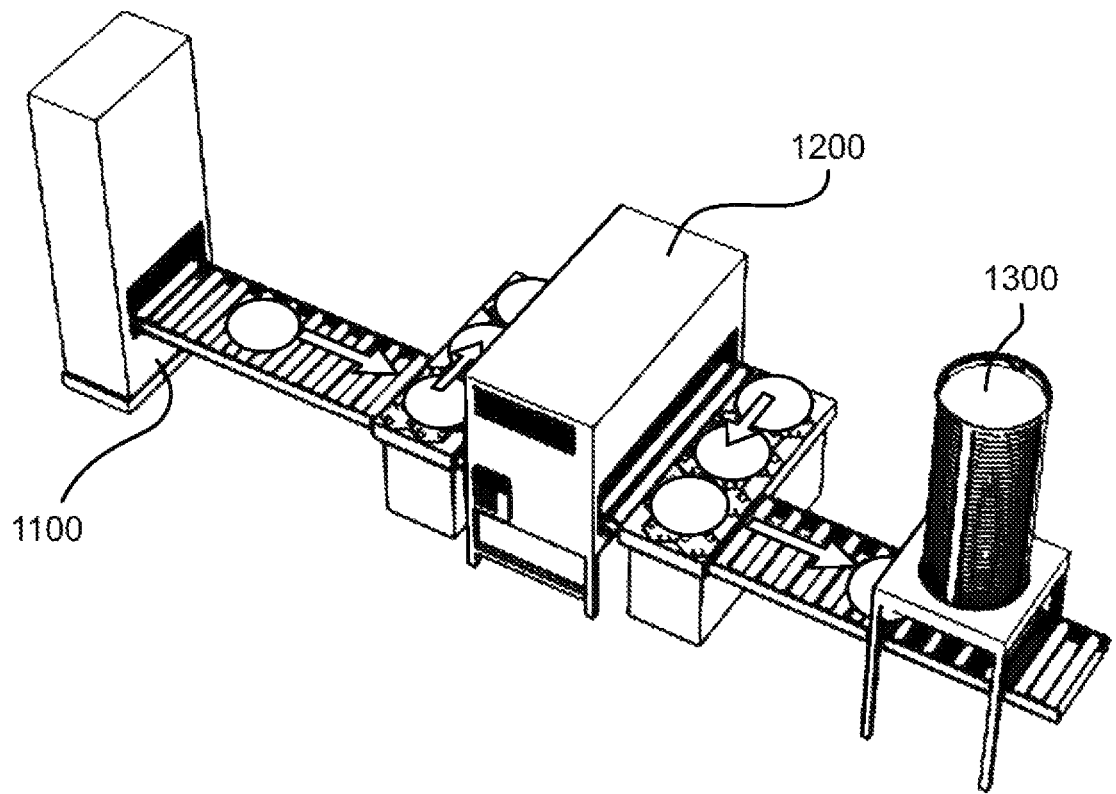
FIG. 3A is an perspective view of an embodiment of the automated pizza kitchen wherein the oven may accommodate multiple pizzas.
Figure 4:
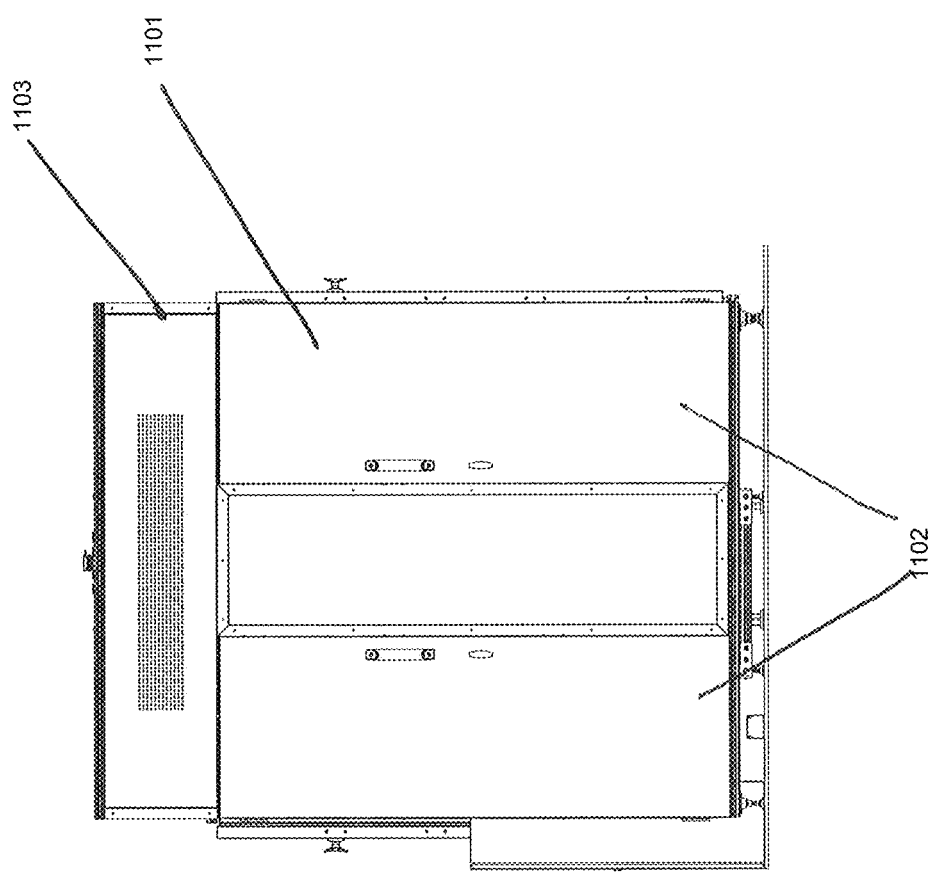
FIG. 4 is a front exterior view of the refrigerator of an embodiment of the automated pizza kitchen invention.

FIG. 3 shows a single pizza box bottom 1315 proceeding through the automated pizza kitchen 1000, but the conveyors 1500, 1600, 1700, 1800 may be sized to accommodate multiple pizza box bottoms 1315 to proceed through the automated pizza kitchen 1000 side by side, as shown in FIG. 3A. Alternatively, multiple conveyors 1500, 1600, 1700, 1800 may be place side-by-side increase capacity but still permit the pizza box bottoms 1315 to travel at different speeds.

Figure 5:
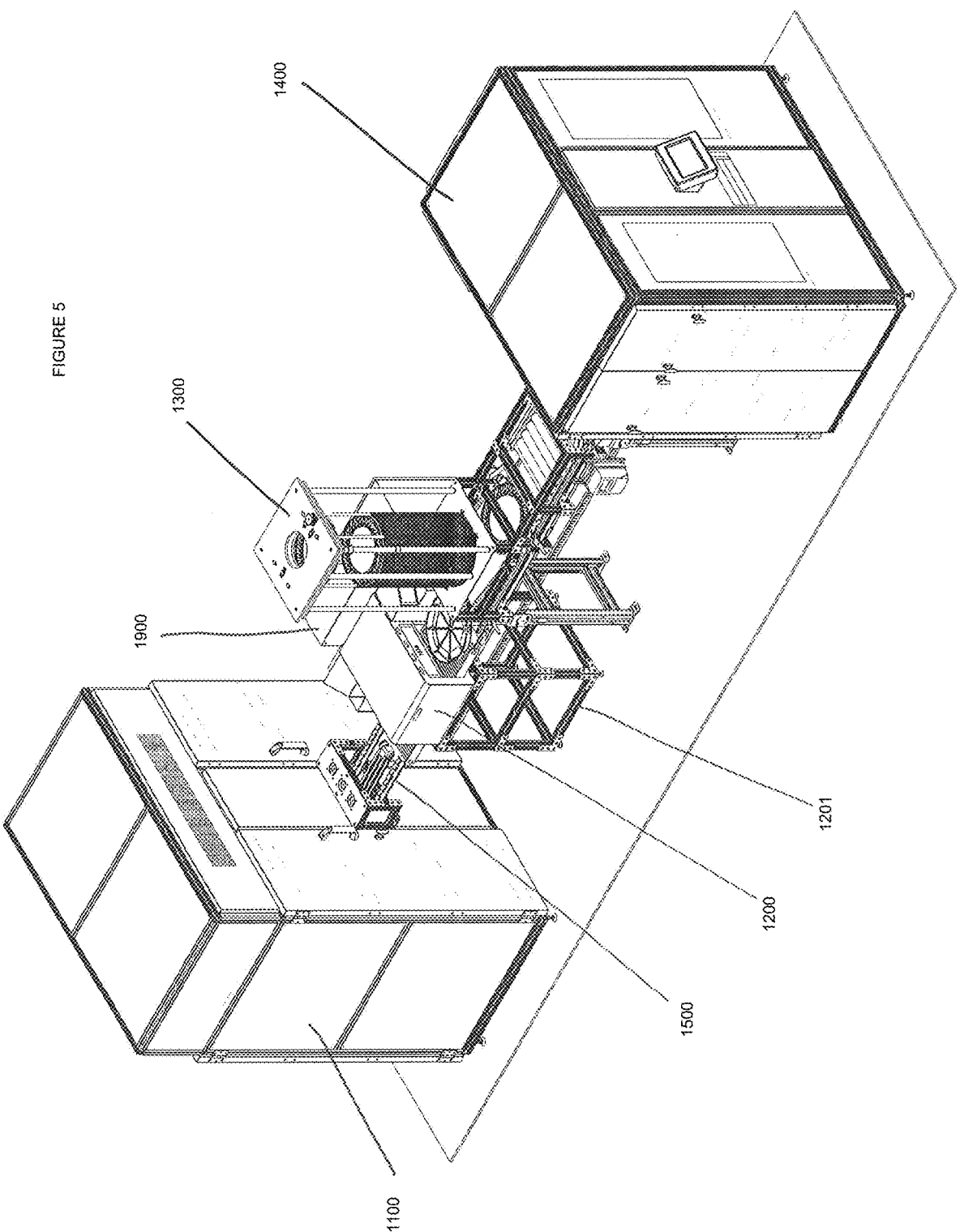
FIG. 5 is a first perspective view of an embodiment of the automated pizza kitchen invention.

As shown in FIG. 5, the oven 1200 is secured to an oven support base 1201 at the appropriate height so that the pizza box bottom 1315 may smoothly move from the refrigerator-to-oven conveyor 1500 to the oven conveyor 1800. The oven 1200 may be of a type commonly known in the art as capable of producing 450 degree Fahrenheit heat. In one embodiment, the oven 1200 is the type that comprises heating elements (not shown) along the side of the interior of the oven 1200 and fans (not shown) that force the interior heated air over the top, and below the bottom, of the pizza box bottom 1315. The oven conveyor 1800 may be configured so that it moves the pizza box bottom 1315 through the length of the oven 1200 in about three minutes when cooking a twelve inch pizza 2000. The oven conveyor 1800 may be configured to move faster or slower, and, for example, may be configured to move items like bread sticks or pastries through the oven 1200 in approximately thirty to forty-five seconds. The oven 1200 may include sensors to measure air speed, cavity temperature and belt speed and these variables may also be changed by the oven 1200 based on the product being cooked (and for example, a code contained on the pizza box bottom 1315 may direct the manipulation of these variables). In one embodiment, the variables may change within a matter of seconds therefore permitting different products to be cooked by the oven 1200 in quicks succession. In another embodiment, the oven 1200 further comprises a visual sensing system that can detect and confirm the product contained in the pizza box bottom 1315 by its appearance and shape before it enters the oven 1200. The visual sensing system may be the vision system manufactured by Sick Sensor Intelligence.

Figure 17A:
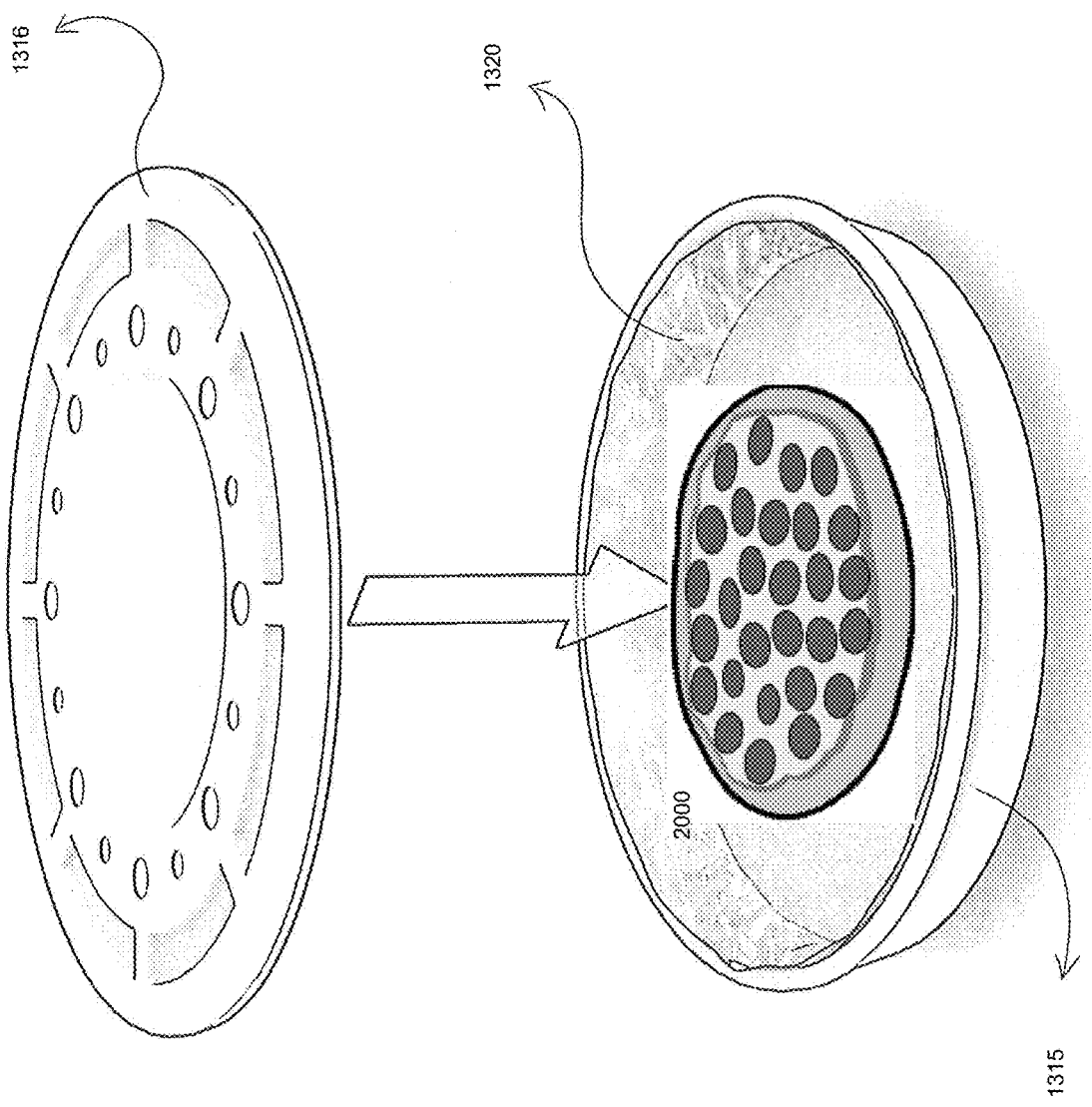
FIG. 17A is a perspective view of an embodiment of a pizza box bottom and interior.

The pizza box bottom 1315 may be comprised of a thermoformed sugarcane and/or bamboo bagasse and heat tolerant for the conditions experienced in the oven 1200. The pizza box bottom 1315 may also comprise a foil liner 1320 to enhance cooking. FIG. 17A depicts a pizza 2000 contained in a pizza box bottom.

Figure 6:
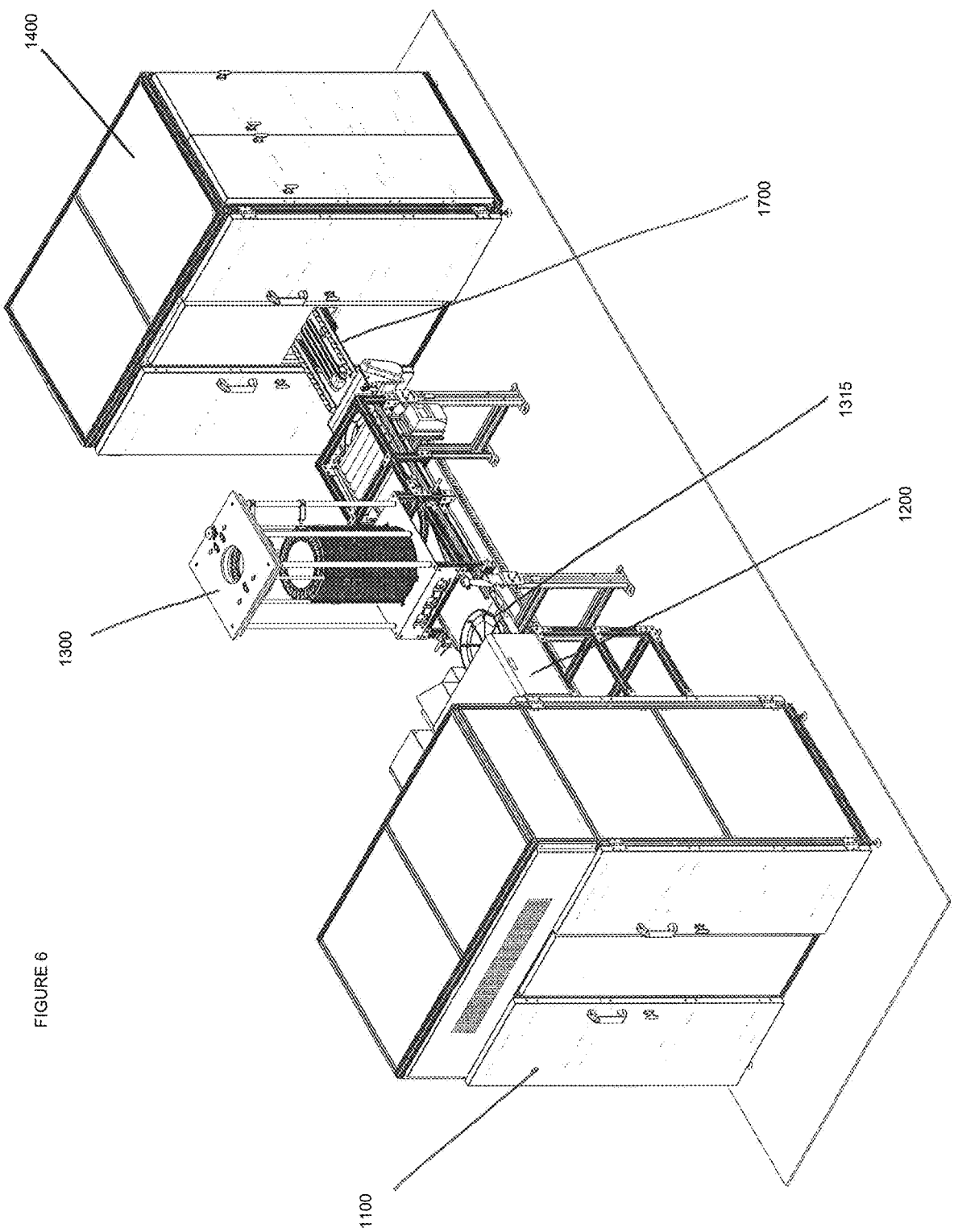
FIG. 6 is a second perspective view of an embodiment of the automated pizza kitchen invention.
Figure 10:
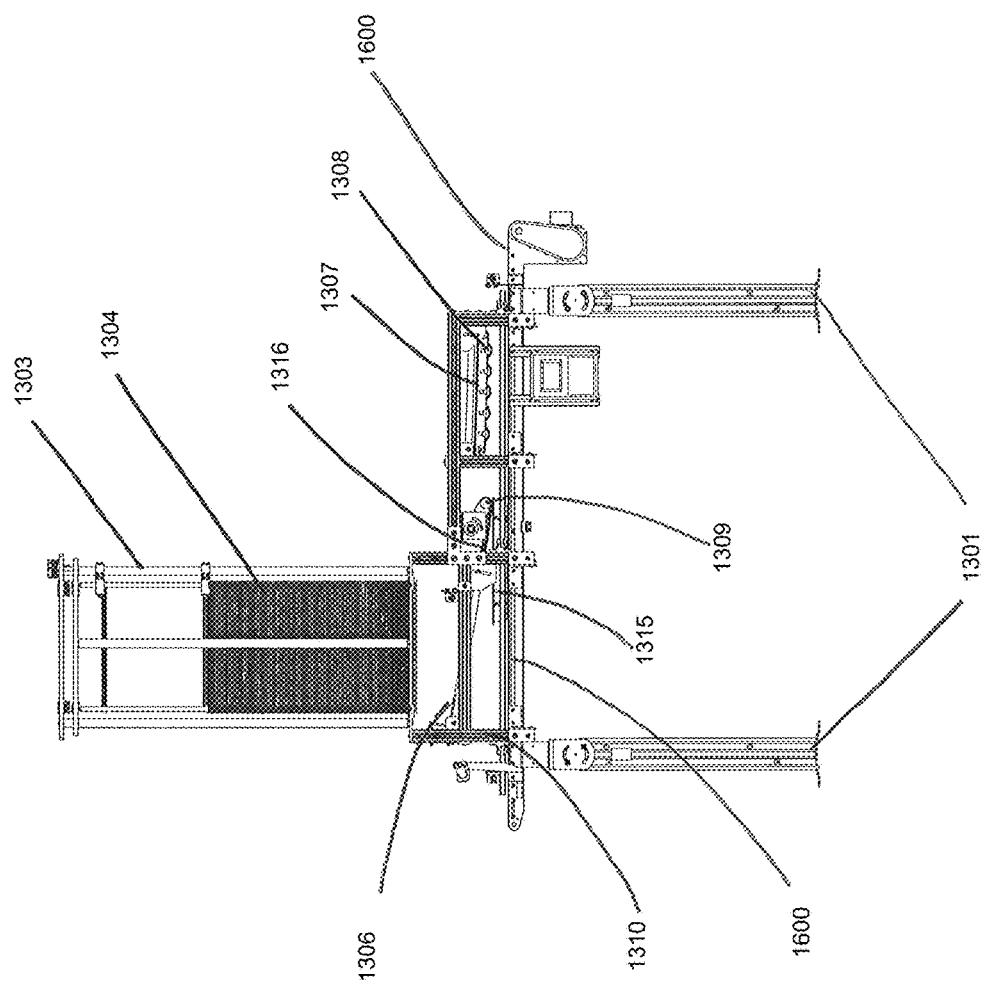
FIG. 10 is a side view of the lid placer of an embodiment of the automated pizza kitchen invention.
Figure 11:
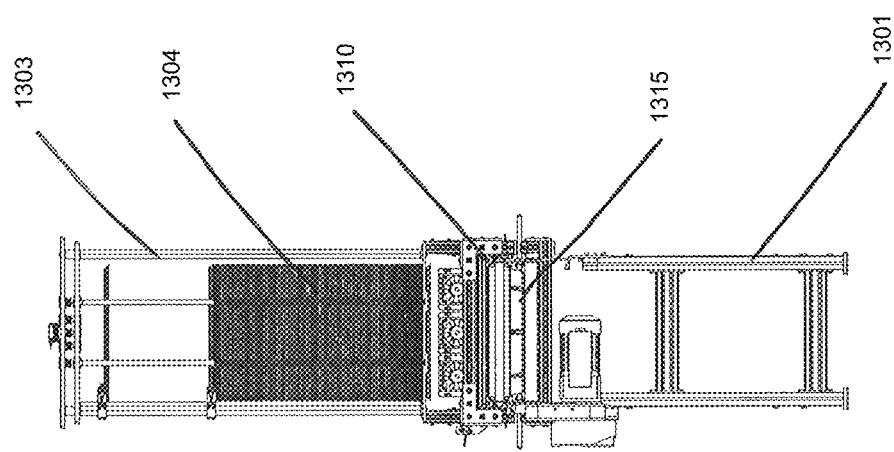
FIG. 11 is rear view of the lid placer of an embodiment of the automated pizza kitchen invention.
Figure 12:
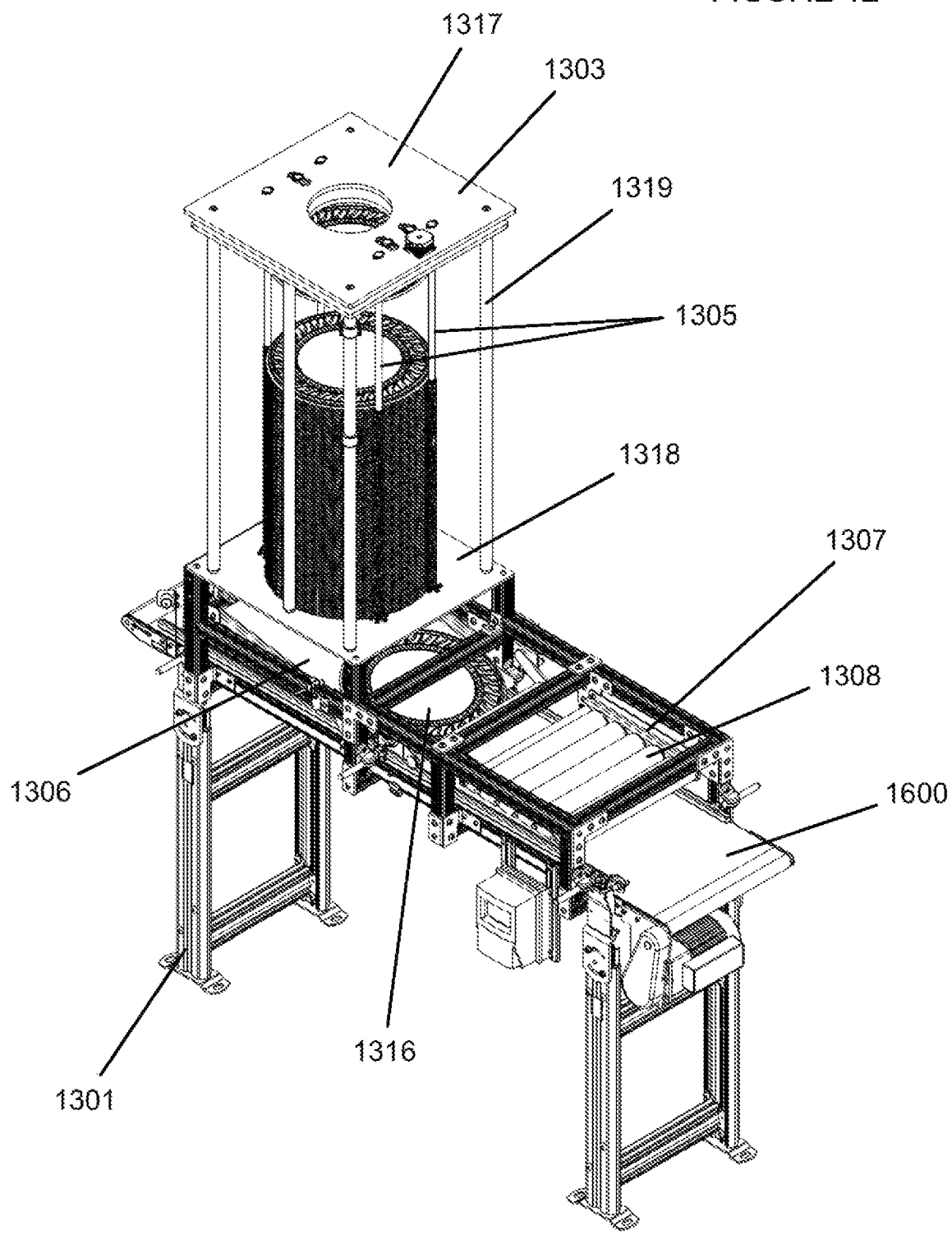
FIG. 12 is a perspective view of the lid placer of an embodiment of the automated pizza kitchen invention.

As can be seen in FIGS. 1 and 6, after leaving the oven 1200, the pizza box bottom 1315 is moved onto the lid placer conveyor 1600 and into the lid placer 1300. The lid placer 1300 is shown in FIGS. 10-12, and comprises a lid securer frame 1310 located above the leg supports 1301. A lid cage 1303 is located above the lid securer frame 1310. As best seen in FIG. 12, the lid cage 1303 comprises a lid cage bottom 1318 and a parallel lid cage top 1317 wherein the lid cage top 1317 is held up by lid cage vertical supports 1319. Contained within the lid cage 1303 are stacked lids 1304 and dispensing rods 1305 capable of dispensing one pizza box lid 1316 so that it can be secured to the pizza box bottom 1315.

One full 360 degree turn of the dispensing rods 1305 results in the dropping of a single pizza box lid 1316. In one embodiment, the stacked lids 1304 may comprise three or four single pizza box lids 1316 held in place by threads of the dispensing rods 1305 and wherein these three or four single pizza box lids 1316 are spaced apart from another set of three or four single pizza box lids 1316.

Figure 17B:
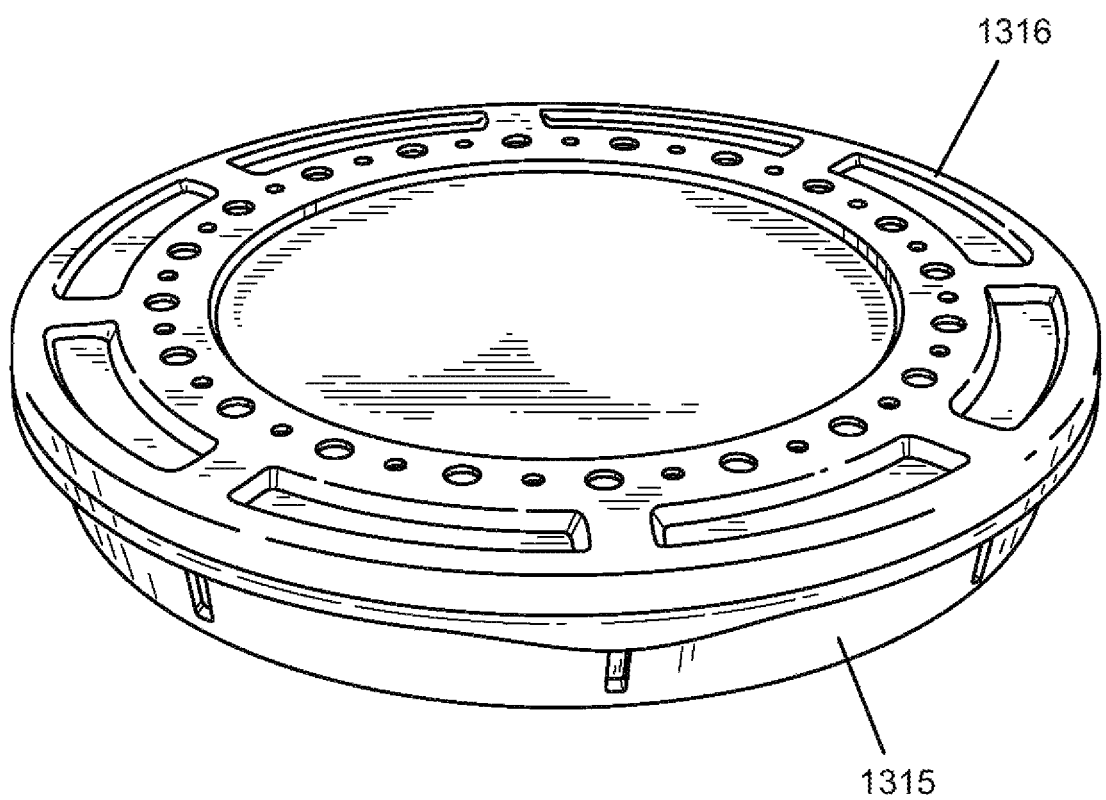
FIG. 17B is a perspective view of an embodiment of a pizza box bottom with a pizza box lid secured.

After the dispensing rods 1305 release a single pizza box lid 1316, it will slide down a lid slide 1306 that directs it towards the pizza box bottom 1315. Alternatively, the single pizza box lid 1316 may drop straight down and then be pushed toward the warmer by another mechanism. The leading edge of the pizza box lid 1316 may also contact a crescent-shaped lid edge stopper 1309 that helps place and direct the pizza box lid 1316 onto the pizza box bottom 1315. The lid placer conveyor 1600 will continue to move the pizza box bottom 1315, now with the pizza box lid 1316 resting on top, through the lid securer 1307 which will apply downward pressure to the pizza box lid 1316 to secure it to the pizza box bottom 1315. This downward pressure is achieved by the lid placer conveyor 1600 directing the pizza box bottom 1315 underneath a series of lid securer rollers 1308 wherein each lid securer roller 1308 is incrementally lower, by a few millimenters, thereby pushing the pizza box lid 1316 securely onto the pizza box bottom 1315. Alternatively, the pizza box lid 1316 may be pushed onto the pizza box bottom 1315 by a compressing plate. FIG. 17B depicts the pizza box bottom 1315 with the pizza box lid 1316 secured.

Figure 18A:
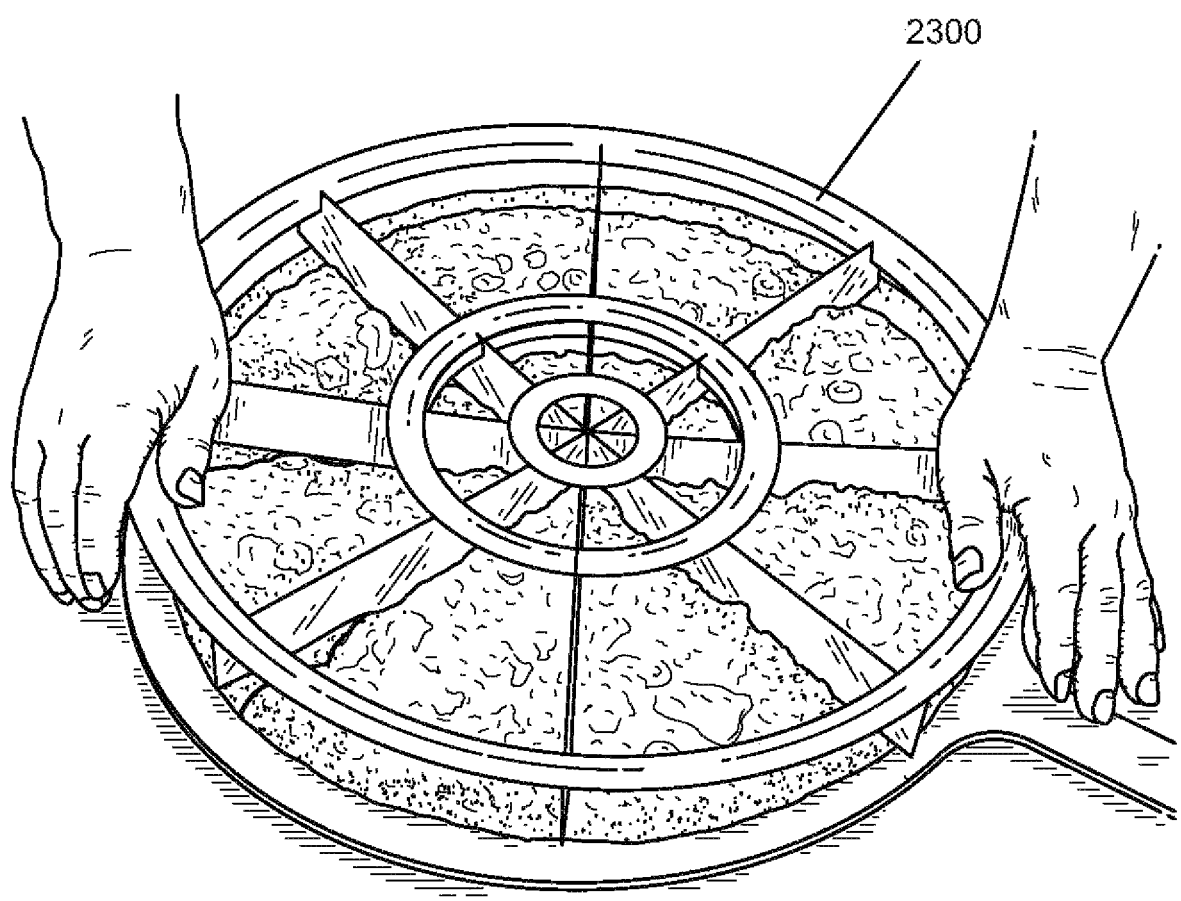
FIG. 18A is a view of an exemplary pizza cutting device.

In an alternate embodiment, the pizza box bottom 1315 travels through a pizza cutting device 2300 prior to entering the lid placer 1300. The pizza cutting device 2300 can be lowered to apply pressure to cut through the pizza 2000 but not the pizza box bottom 1315. In one embodiment, the pizza cutting device 2300 is similar to the one shown in FIG. 18A. The pizza cutting device may also be attached to a gantry and/or actuator that permits it to enter a washing mechanism to clean the pizza cutting device after each use wherein the washing mechanism uses brushes or water pressure to clean and may also comprise a receptacle underneath to catch debris.

Figure 2:
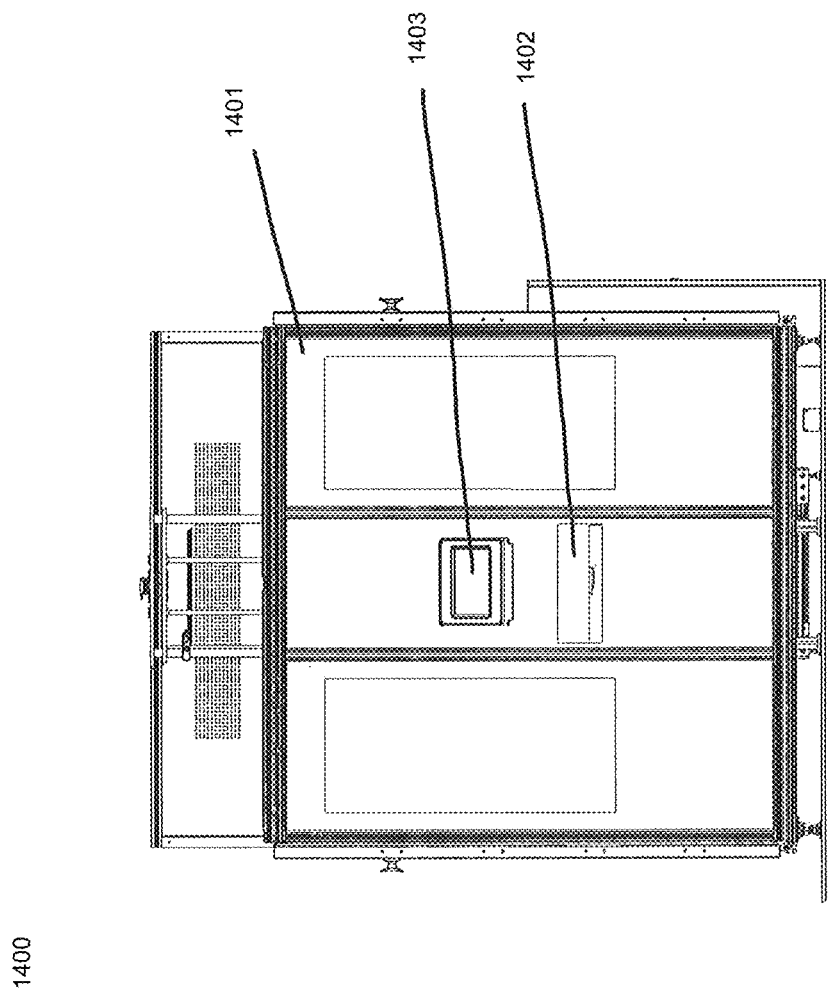
FIG. 2 is a front exterior view of the warmer of an embodiment of automated pizza kitchen invention.
Figure 13:
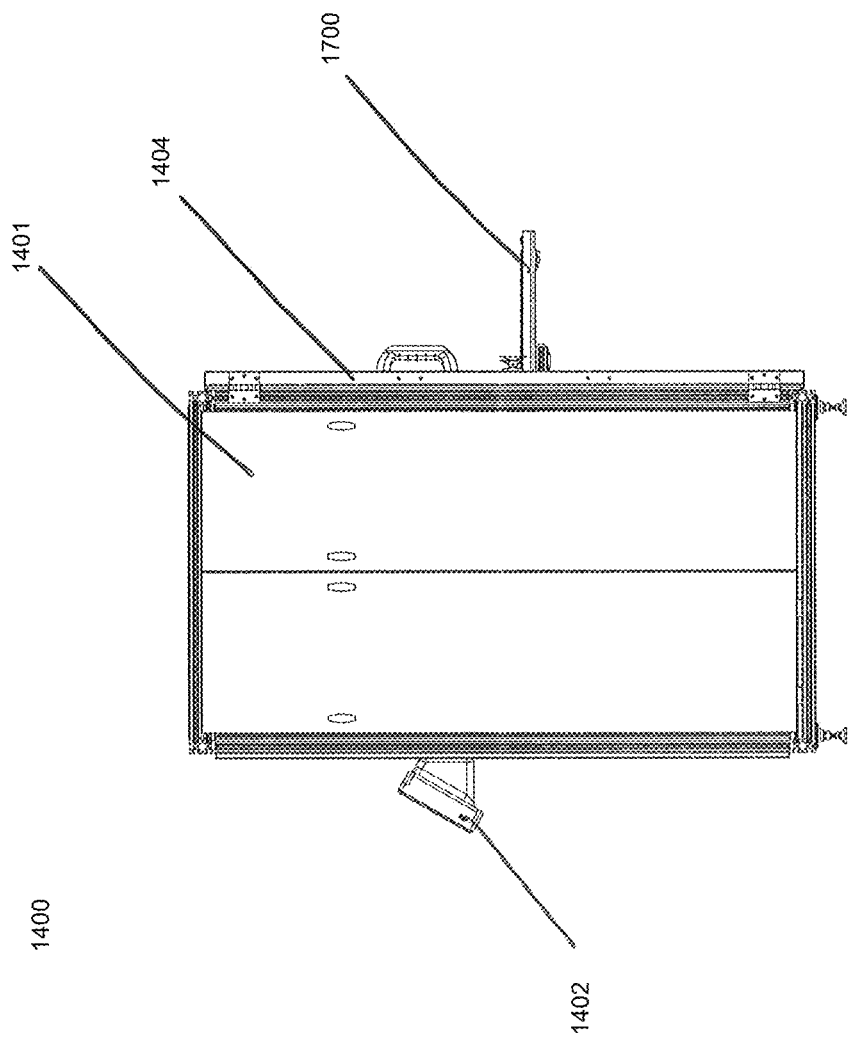
FIG. 13 is a side view of the warmer of an embodiment of the automated pizza kitchen invention.
Figure 14:
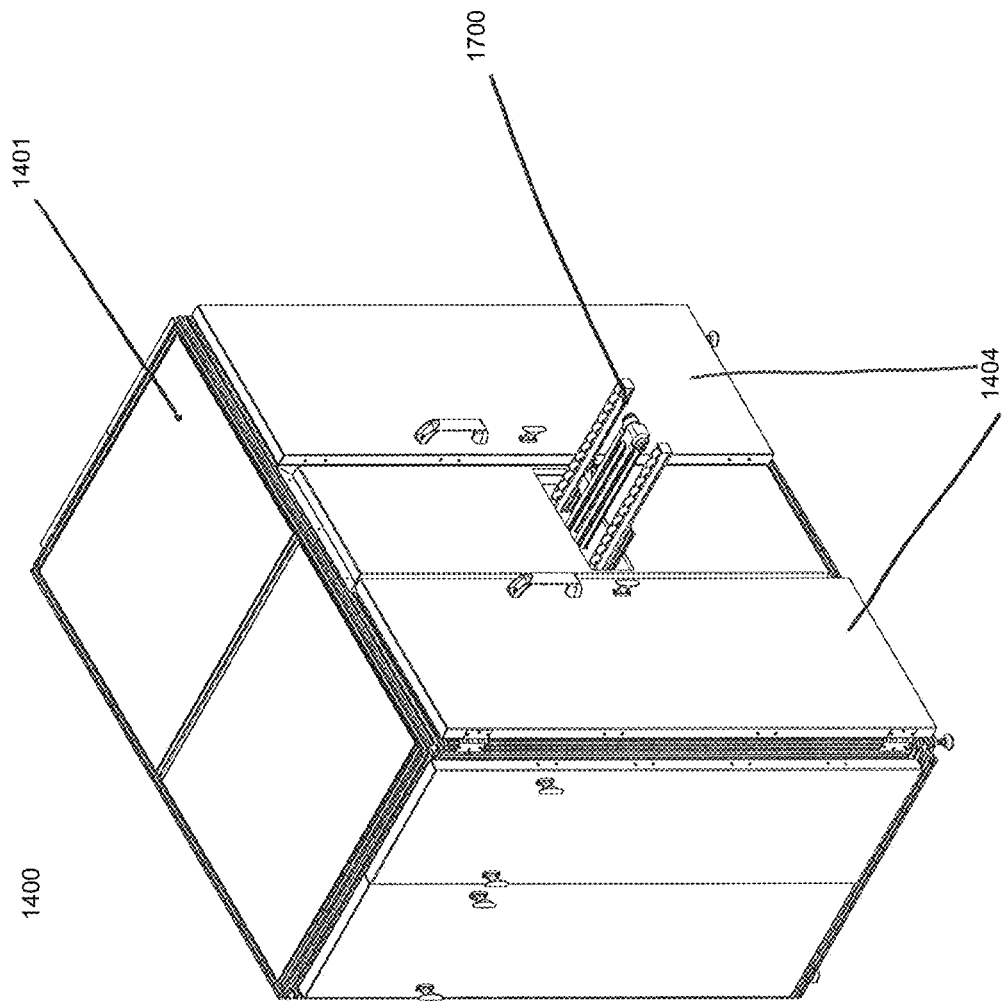
FIG. 14 is a perspective view of the warmer of an embodiment of the automated pizza kitchen invention.

After leaving the lid placer 1300, the pizza box bottom 1315 is transferred to the lid placer-to-warmer conveyor 1700 and then into the warmer 1400, as shown in FIGS. 13 and 14. The warmer 1400 comprises a warmer housing 1401 and rear warmer doors 1404 for accessing the interior of the warmer 1400. As shown in FIG. 2, the front of the warmer 1400 comprises a pizza dispenser 1402 and a customer interface 1403 that can be used to order a pizza or indicate that the customer 2600 is ready to pick up a previously ordered pizza.

FIG. 15 shows in the interior of the warmer 1400. The interior of the warmer 1400 comprises multiple parallel warmer vertical supports 1407 to which a multitude of warmer shelves 1405 are attached. In the embodiment shown in FIG. 15, the warmer 1400 comprises two columns of warmer shelves 1405 with each column comprising approximately 11 warmer shelves 1405 arranged in parallel. The warmer shelves 1405 are further secured to the warmer vertical supports 1407 using warmer shelf supports 1406. The warmer shelves 1405 may be w-shaped like the shelves shown in FIG. 19.

Figure 15A:
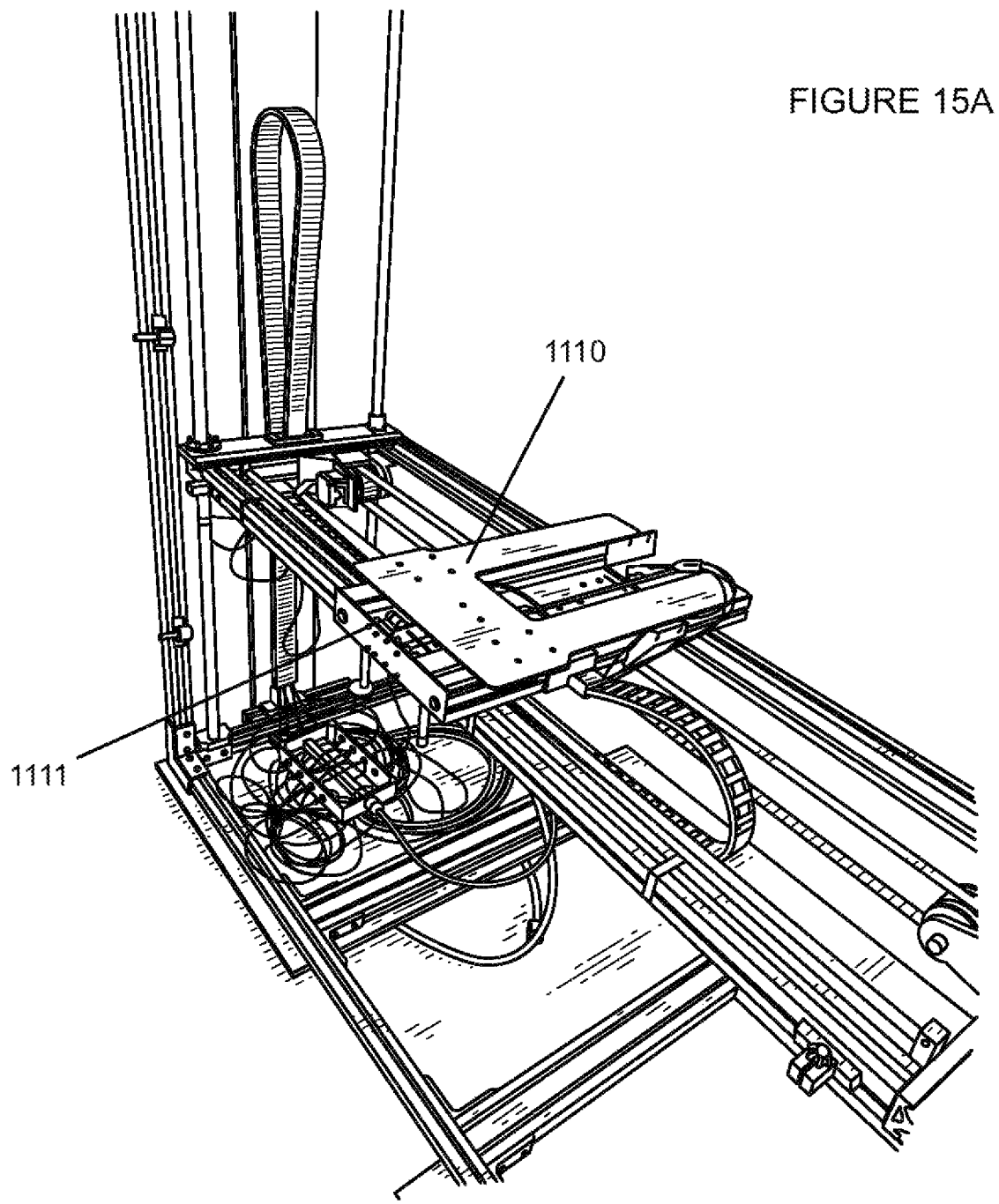
FIG. 15A is a close-up view of the cooked pizza selection device.

FIGS. 15 and 15A also depict the cooked pizza selection device 1409 that is used to place the pizza 2000 contained in the pizza box bottom 1315 onto a warmer shelf 1405 (wherein the appropriate warmer shelf 1405 may be identified by the code on the pizza box and the code will direct the cooked pizza selection device 1409 to the appropriate warmer shelf 1405). Also, the pizza selection device 1409 may move a pizza 2000 contained in a pizza box bottom 1315 from a warmer shelf 1405 and out of the warmer 1400 through the pizza dispenser 1402. The cooked pizza selection device 1409 may comprise a lifting platform (insert new figure number if we get drawing) controlled by a linear actuator (insert new figure number if we get drawing) capable of moving the lifting platform along an xy or xyz axis. In one embodiment, the cooked pizza selection device may be an XYZ Gantry manufactured by Igus.

The warmer 1400 further comprises a warming unit and humidity control system 1411 capable of heating the interior of the warmer 1400 to the desired temperature (for example, at 150 degrees Fahrenheit) and maintaining the humidity inside the warmer 1400 at a pre-determined amount or within a pre-determined range.

Sensors of the warmer 1400 are also capable of measuring how long a pizza 2000 has remained on a warmer shelf 1405, and if that time exceeds a pre-determined amount, then the cooked pizza selection device 1409 will remove the pizza 2000 from the warmer shelf 1405 and place it into the discarded pizza storage 1410 found near the bottom of the warmer 1400.

The warmer 1400 may also comprise a fan that moves air from the interior to the exterior of the warmer (not shown). It is believed that this fan will increase customer engagement with the automated pizza kitchen 1000 as customers 2600 passing by will encounter the aroma of cooked pizzas in the air and will be enticed to order a pizza.

The warmer 1400 may also comprise a door or opening near the top of the warmer (not shown) to permit overhead drones to pick-up cooked pizzas.

Automation of Pizza Kitchen & Components

As seen in FIG. 9, the automated pizza kitchen 1000 further comprises a control housing 1900. As described further below, the control housing 1900 comprises certain of the hardware, such as the system processor 1513, required for the automation of the automated pizza kitchen 1000.

The automated pizza kitchen system 1501 monitors and interacts with the various sub-components (e.g., refrigerator 1100, over 1200, lid placer 1300 and warmer 1400) and their various sensors to arrange for the timely and correct preparation of pizzas 2000.

Figure 16:
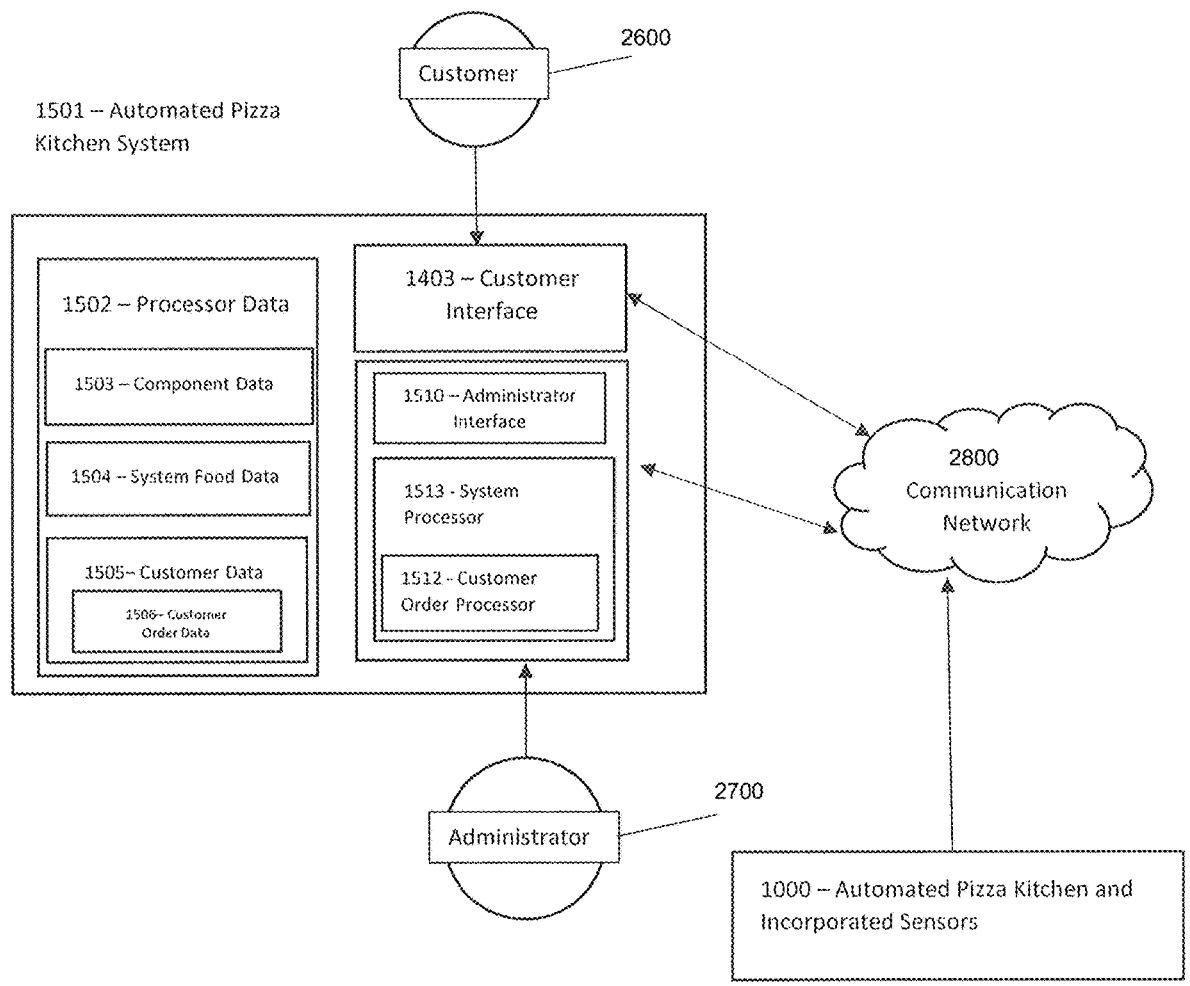
FIG. 16 is a diagram of the automation of an embodiment of the automated pizza kitchen.
Figure 16A:
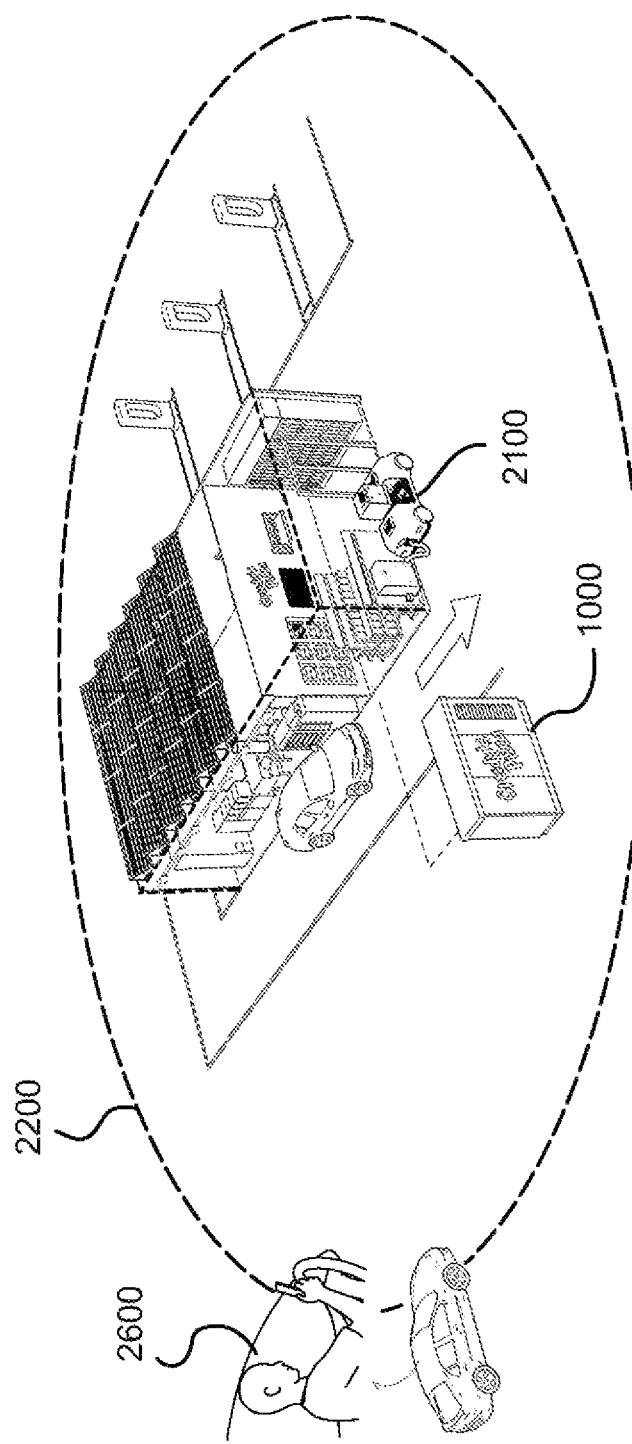
FIG. 16A is a diagram of a method of retrieving a pizza from an embodiment of the automated pizza kitchen.

FIG. 16 depicts the overall use of the automated pizza kitchen system 1501. The entire system 1501 preferably comprises the: (i) processor data 1502; (ii) customer interface 1403; (iii) system processor 1513; (iv) administrator interface 1510; (v) communication network 2800; and (vi) the automated pizza kitchen 1000.

The processor data 1502 comprises component data 1503, system food data 1504 and customer data 1505. For example, component data 1503 may comprise data received from various sensors contained in the various components, such as the temperature and humidity levels of the refrigerator 1100, the temperature of the oven 1200 or the temperature and humidity levels of the warmer 1400. System food data 1504 may comprise comprises data regarding the food in the automated pizza kitchen 1000—such as the time that a pizza 2000 has been held in the warmer 1400. Customer data 1505 may include name, customer phone number and the like. Customer data 1505 also preferably comprises customer order data 1506. Customer order data 1506 comprises data regarding a specific order—for example, why type of pizza 2000 the customer 2600 ordered.

The customer interface 1403 comprises a computing device for use by customer 2600 for inputting customer data 1505. In some embodiments, an example of a customer interface 1403 could be a point of sale (POS) (as shown in FIG. 2) or perhaps a cellular phone, mobile device or and the like. One goal of customer interface 1403 is to collect customer data 1505 and customer order data 1506 and communicate that data 1505, 1506 to the system processor 1513 via the communication network 2800.

The system processor 1513 analyzes the various processor data 1502 (received via the communication network 2800) to determine when to initiate the pizza 2000 cooking process, which pizzas 2000 to remove from the refrigerator 1100, how long to cook the pizzas 2000 in the oven 1200, where to store the pizzas 200 in the warmer 1400 and how to dispense the pizzas 2000, etc. The system processor then communicates via the communication network 2800 to the various components of the automated pizza kitchen 1000 to automate the pizza cooking process.

The system 1501 may also include an administrator interface 1510 (which may be a POS, cellular phone or mobile device, etc.) that permits the administrator 2700 to input processor data 1502 and manually control the automated pizza kitchen 1000, if desired.

Method of Using the Automated Pizza Kitchen

As an initial step in using the automated pizza kitchen 1000, the owner or manager stocks the refrigerator 1100 with the desired number and types of pizzas 2000 by placing the pizzas 2000, contained within the pizza box bottoms 1315 on the refrigerator shelves 1106. The owner or manager may then input, using the administrator interface 1510, data related to what type of pizza 2000 was placed on which refrigerator shelves 1106.

A customer 2600 may then place an order for a pizza 2000 using: (1) a third-party platform; (2) a mobile device; or (3) a customer interface 1403 located on the exterior of the warmer 1400.

When a customer 2600 orders a pizza 2000 (or any other food product offered) using a third-party platform, the order entered via the third-party platform is communicated to the customer interface 1403 which sends a unique code to the system processor 1513 of the automated pizza kitchen 1000. The system processor 1513 then uses the data associated with that unique code to wirelessly communicate with the automated pizza kitchen 1000 to direct it how to cook and store the pizza 2000. When a delivery driver or autonomous delivery vehicle 2100 approaches the automated pizza kitchen 1000, the automated pizza kitchen 1000 may detect it via a proximity trigger 2200, GPS or RFID tracking, and then dispense the pizza 2000 out of the warmer 1400. Additionally, the system processor 1513 may be able to communicate with a traffic application to predict when the customer 2600 is expected to arrive at the automated pizza kitchen 1000.

When a customer 2600 orders a pizza 2000 through a mobile device or the customer interface 1403, the customer interface 1403 sends a unique code to the mobile device or to the customer interface 1403 (which is also capable of printing that unique code to the customer 2600). The system processor 1513 again uses that unique code to wirelessly communicate with the automated pizza kitchen to direct it how to cook and store the pizza 2000. When the customer 2600 approaches the automated pizza kitchen 1000, it may detect the customer 2600 via mobile tracking, facial recognition or by having the customer 2600 scan the unique code, and dispense the pizza 2000 out of the warmer 1400.

In one embodiment, after the customer 2600 places their order (and assuming the customer 2600 wants to pick up the pizza 2000 as quickly as possible), the system processor 1513 will determine whether a pizza 2000 of the type desired by the customer 2600 is located in the warmer 1400 (which may be the case if the system processor 1513 or administrator 2700 directed the automated pizza kitchen 1000 to make certain pizzas 2000 in advance of an expected demand). The customer interface 1403 may indicate to the customer 2600 what pizzas 2000, if any, are available in the warmer 1400, in the event the customer 2600 desires a pizza 2000 that is ready for immediate delivery.

If the customer's 2600 desired pizza 2000 is located in the warmer 1400, the system processor 1513 will identify the warmer shelf 1405 of the desired pizza 2000 so that it may be dispensed when the customer 2600 indicates they are ready to pick it up (described below).

If the desired pizza 2000 is not already located in the warmer 1400, the system processor 1513 will direct the refrigerated pizza selection device 1108 to select the appropriate pizza 2000 and begin the cooking process in the time and manner indicated by the processor data 1502. After the pizza 2000 is cooked by the oven 1200 and packaged by the lid placer 1300, it will be ready for pick-up by the customer 2600.

The term "pizza 2000" is generally used to describe the food product prepared by the automated pizza kitchen 1000; however, this term is not limited to traditional pizzas and may further include calzones, breadsticks, pastries and other food products.

What is claimed is:

1. An automated pizza kitchen comprising:
   a refrigerator further comprising refrigerator shelves; a refrigerated pizza selection device wherein said refrigerated pizza selection device further comprises a lifting platform and actuator; and a refrigerator exit door;
   an oven comprising an oven conveyor and wherein said oven is connected to said refrigerator by a refrigerator-to-oven conveyor;
   a lid placer comprising a lid placer conveyor wherein said lid placer conveyor connects said lid placer to said oven conveyor and wherein said lid placer farther comprises: a lid cage surrounding a stack of pizza box lids; dispensing rods for dispensing individual pizza box lids; and a lid securer; and
   a warmer wherein said warmer is connected to said lid placer conveyor by a lid placer-to-warmer conveyor and wherein said warmer further comprises warmer shelves; a cooked pizza selection device; and a pizza dispenser; wherein said automated pizza kitchen is configured to remove a pizza from said refrigerator; place said pizza on said refrigerator-to-oven conveyor, cook said pizza in said oven, and place said pizza in said warmer, all without human intervention.

2. The automated pizza kitchen of claim 1 wherein said refrigerator further comprises a humidity control system and said refrigerator is configured to automatically maintain humidity in said refrigerator at a predetermined level.

3. The automated pizza kitchen of claim 1 wherein said refrigerator further comprises an operable and closeable refrigerator exit wherein said refrigerator exit further comprises an exhaust fan.

4. The automated pizza kitchen of claim 1 wherein said lid securer further comprises a series of lid securer rollers and wherein each of said lid securer rollers is incrementally lower than the previous roller, wherein said pizza is positioned on a top of a pizza box bottom when said pizza passes through said oven, wherein said lid placer is capable of placing one of said stack of pizza box lids on top of said pizza box bottom, and wherein said lid securer rollers are configured o apply pressure to said one of said stack of pizza box lids and said application of pressure results in said one of said stack of pizza box lids being rem ably fastened to said pizza box bottom.

5. The automated pizza kitchen of claim 1 wherein said warmer further comprises a discarded pizza storage, and wherein said warmer is configured to identify a duration of time each said pizza has been present in said warmer and to move each said pizza to said discarded pizza storage based on said duration of time.

6. The automated pizza kitchen of claim 1 wherein said warmer further comprises a humidity control system and said warmer is configured to automatically maintain humidity at a predetermined level.

7. The automated pizza kitchen of claim 1 wherein said refrigerated pizza selection device further comprises a marking device capable of placing an identifying code on a pizza box bottom.

8. The method of using said automated pizza kitchen of claim 1 wherein:
   a customer enters an order into a customer interlace;
   said customer interface communicates with a system processor; and
   said system processor directs the automated pizza kitchen to prepare said order, and wherein preparation of said order alternatively includes cooking said pizza and dispensing said pizza in response to said order or comparing said order to an inventor of pre-cooked pizzas stored in said warmer and dispensing one of said pre-cooked pizzas in response to said order.

9. The method of claim 8 wherein said customer interface is accessible from a mobile device of the customer's and said system processor provides a unique code to said customer corresponding to said order.

10. The method of claim 9 wherein said unique code can be scanned or entered at said automated pizza kitchen to indicate that said customer is ready to pick-up said order.

11. The method of claim 10 wherein said customer's order is reflected in said identifying code placed on said pizza box bottom by said marking device.

12. The automated pizza kitchen of claim 1, wherein each said pizza is positioned on a top surface of a pizza box bottom, wherein said automated pizza kitchen further comprises a code scanner configured to scan one or more codes placed said pizza box bottom and wherein said oven is configured to differentially cook each said pizza in response to said one or more codes.

13. The automated pizza kitchen of claim 12, wherein said pizza box bottom is comprised of a thermoformed sugarcane or bamboo bagasse.

* * * * *